April 6, 1948.  A. J. McCORMACK  2,439,259
FIELD PICK UP HAY CHOPPER
Filed Jan. 17, 1944  2 Sheets-Sheet 2

Inventor
Arden J. McCormack

By
Samuel H. Davis.
Attorney

Patented Apr. 6, 1948

2,439,259

UNITED STATES PATENT OFFICE 2,439,259

FIELD PICKUP HAY CHOPPER

Arden J. McCormack, Portland, Mich.

Application January 17, 1944, Serial No. 518,628

1 Claim. (Cl. 55—118)

This invention relates to mounted pick up hay choppers, and the object of the invention is the production of a superior special construction of a machine for picking up hay from the left of the hay windrow and serving and passing the hay to the chopper in the best arrangement for chopping the hay, and from the chopper delivering the chopped hay to a blower whereby it is driven through a suitable conducting pipe and deposited in a wagon for transportation. The principal feature of this invention is believed by the applicant to be its cheap and simple construction carried underneath the tractor instead of trailing after the tractor, and permitting a shorter discharge pipe to be employed whereby the wagon receiving the chopped hay may be brought closer to the discharge pipe by the operators of the invention, so that no wind blowing during the operation will interfere with the free and proper discharge of the chopped hay put into the wagon as desired.

Figure 1:
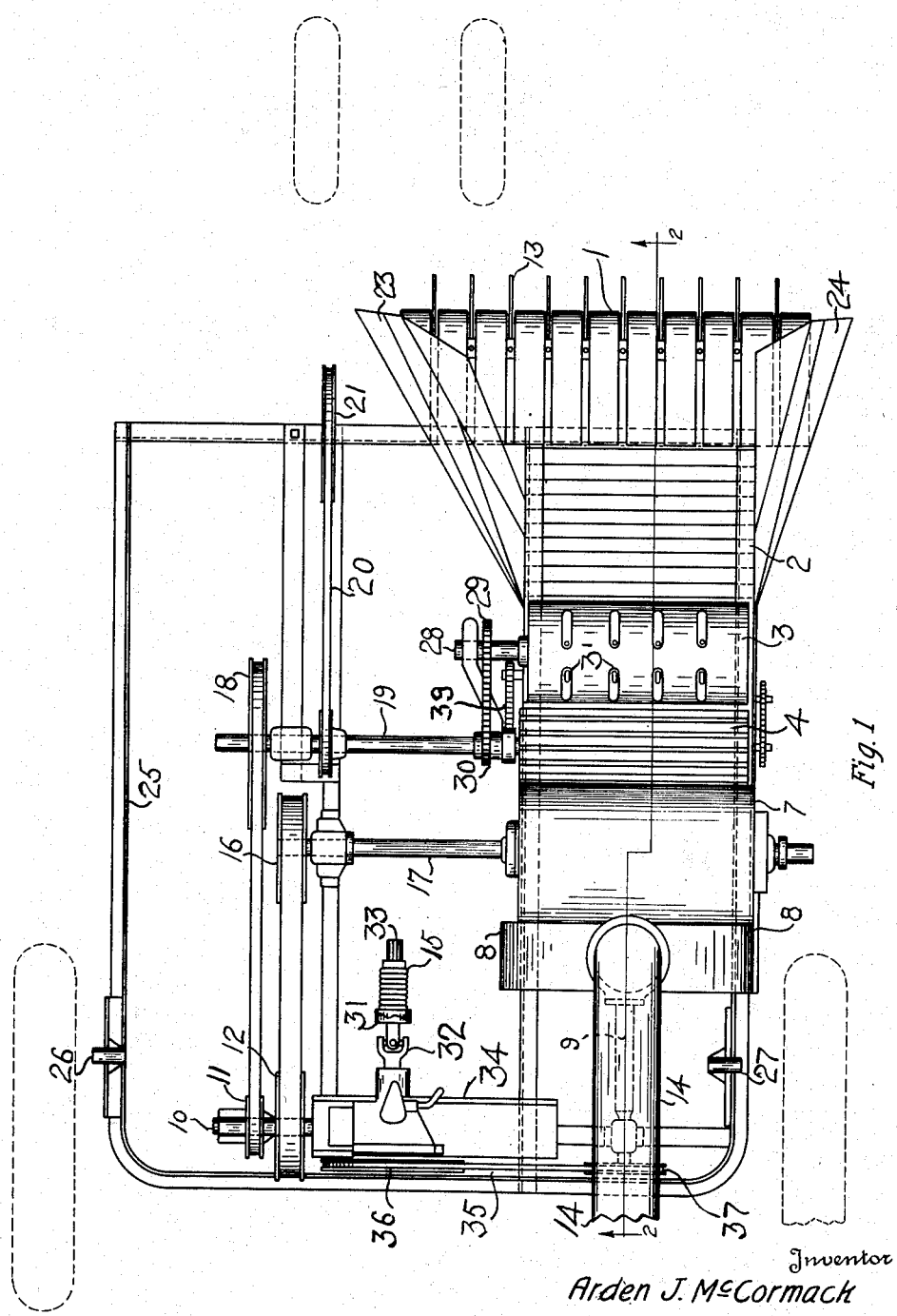

The special construction constituting this invention is illustrated in the accompanying drawings of which Fig. 1 represents a top plan view showing all parts assembled.

Figure 2:
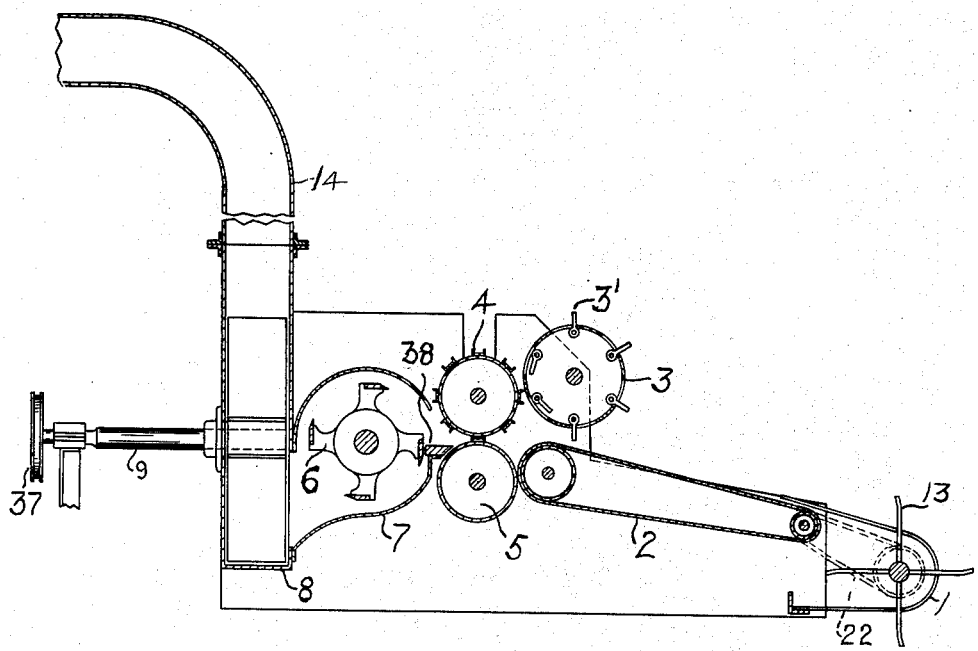

Fig. 2 is a vertical sectional illustration the section being taken on the line 2—2 of Fig. 1.

The pick up housing 1 at the end of the machine leads onto the conveyer 2, from which the hay is passed by the sweeping and directing roll 3 from the conveyer to the chopper serving rolls 4 and 5. The hay is thus served to the chopper 6 in the chopper case 7. 1 refers to the curved and slotted shell of the pick up, best shown in Fig. 1 at the end of the machine, through which project the spring pick up fingers 13.

2 is the chain and sprocket driven conveyer which carries the hay from the rotary pick up to the feeder and compression rollers. The conveyer is a number of transverse slats like a belt.

3 is the feeder roll with disappearing fingers which starts to compress and feed the hay to the compression and serving rolls.

4 is the upper compression roll, which is arranged to move up and down compressing different amounts of hay acted upon. This upper roll is the larger of the two compression rolls 4 and 5, and it is provided as shown in Fig. 2 with a number of spaced, longitudinally attached channel irons the edges of which engage the hay and aid in the movement thereof towards the chopper.

5 is the lower compression roll directly beneath the upper roll 4 and usually smooth on the surface.

6 marks the chopper or cutting knives, which are revoluble as indicated in Fig. 2.

7 refers to the partly cylindrical outside casing of the chopper knives, and constructed to open into the casing of the blower.

8 is the blower, of any desired form and structure.

9 is the operating blower shaft, indicated in Fig. 1 and shown in Fig. 2.

10 points to the main shaft, so termed for the purposes of this description.

11 refers to a pulley or belt wheel on shaft 10 near the end as shown in Fig. 1.

12 marks a second pulley on shaft 10 near the first belt wheel 11.

13 points out the pick up fingers shown in Fig. 1, and projecting through the pick up housing 1.

14 refers to the blower discharge spout or pipe shown in both Figs. 1 and 2.

15 refers to a spiral spring on the power take-off shaft 33, and operating a spring clutch 31 whereby the universal joint 32 with the blower is driven.

17 marks an intermediate shaft transversely passing through the chopper housing and operating the chopper knives.

18 refers to a pulley on the transverse shaft 19 as shown in Fig. 1, and rotating the upper compression roll 4, also shown in Fig. 2.

19 is the transverse shaft shown in Fig. 1 which rotates the upper compression roll 4.

20 refers to the belt that drives the pulley 21 which applies power to the pulleys and belting that drives the rotary pick up as shown in Fig. 1.

22 refers to the belting and pulley devices, of any common construction which drive the pick up shaft and fingers. See Fig. 2.

23 and 24 are the hay guides of any usual form that direct the hay onto the conveyor after it has been picked up by pick up fingers. The hay guides 23 and 24 may be extended in size and modified in form in order that the hay can be adequately directed by the pick up fingers to the conveyor during the operation.

25 refers to the frame of this invention.

26 and 27 as illustrated in Fig. 1, represent the pivots whereby the frame 25 is pivotally attached to the tractor, and raised and lowered by the usual lever devices not shown.

28 is the supporting shaft of the feeder roll 3. It is a transverse shaft, and it also carries the eccentrics in the roll 3, and actuates the disappearing fingers 3' which alternately project through the roll 3 and are withdrawn during the operation.

29 refers to the pulley and belt, or sprocket and chain connection between shaft 19 and shaft 28 by which roll 3 is rotated and the disappearing fingers 3' are projected and lowered during the operation.

30 represents the sprocket or belt wheel on the shaft 19 by which sprocket 29 is driven.

31 is a spring clutch connected with the universal joint 32 driving the blower shaft 9 by suitable belted gearing, from shaft 10.

32 is a universal joint connected with clutch 31 and the power take-off shaft 33 from the tractor. The connection with the tractor motor is not shown as it forms no part of this invention here, but may be arranged in any well known combination of parts.

33 is the power take-off shaft which may be connected and disconnected by the spring clutch 31.

34 refers to the gear case containing gearing for driving the main transverse shaft 10, and consequently the remaining operating members.

35 is a belt connecting the pulleys 36 and 37, shown in Fig. 1.

36 is the belt pulley driven by the mitre gearing in the gear case 34 and operating the belt 35 and pulley 37 on the blower shaft 9, as shown in Fig. 2.

37 is the belt pulley driven by the belt 36 and operating the blower 8.

38 is the adjustable shear plate arranged for co-operation with the rotating cutters 6 as shown in Fig. 2.

The gearing devices shown in Fig. 1 bearing reference number 39 receive power from the transverse shaft 19 and operate to drive the conveyor 2. The application is not intended to be limited to any special gearing devices for this purpose. The rotary pick up, the conveyor and rolls, the chopper and blower are at the right of the frame of the machine and back of the front wheels. The machine parts are driven by the power from the tractor through the slip clutch shown in Fig. 1.

It is believed that the operation of this invention owing to its simple construction will be understood from the foregoing recital of the individual elements, all of common nature.

The invention is mounted beneath the rear axle of the tractor pivotally on the two pivot pins shown on the frame and at the front by suitable springs and lever devices not shown and forming no part of this invention. The whole machine is tilted on the pins by the lever in accordance with standard common practice. The rotary pick up, slatted conveyor, compression rolls, chopper and blower are at the right of the frame of the tractor and back of the front wheels. The positions of the wheels of the tractor are indicated in Fig. 1 by dotted line forms. The front wheels of the tractor are driven at the left of the hay windrow. The machine is driven by the power take-off from the tractor by way of the slip spring clutch to the gear case, which is to the center and back of the chopper housing. The shaft of the gear box extends through and has a pulley which drives the blower shaft. The main shaft 10 which is driven by the bevel gears in the gear box has two pulleys, one of which drives the cutting knives, and the other the rotary pick up, conveyor and other rolls. The pulleys are at the left side of the chopping housing. The rotary pick up has spring fingers which rotate and pick up the hay from the windrow and throw it on the slats and chain conveyer which takes it beneath the feeding roller 3, which has fingers that grasp the hay, and as the roll turns back towards the knives, the fingers disappear because they are on eccentrics. There are two more rolls just behind this roller 3, the top one being larger than the bottom one. The bottom roll is smooth, and the top roll has six to eight half inch channel irons welded to it to help draw the hay into the knives. The top roll mentioned and the roll with the disappearing fingers float up and down so they compress different amounts of hay. This is accomplished by a spring tension device which is not shown in the drawings, but which also holds the upper roll having the channel irons in contact with the smooth lower roll described. The shear plate is back of the rolls and is adjustable to the knives. The knives are mounted on heads at either end and one at the center. The knives are of the lawn mower type, curved, and the shear plate is adjustable to them. It is intended to use two of four knives depending on the length of hay desired to be cut. Back of the knives is a six bladed blower which blows the cut hay through the discharge pipe into the wagon which is hitched to the back of the tractor and near the discharge pipe. The whole machine is driven by belts on pulleys of variable size, so that an arrangement may be made to get any speed desired on any working part of the machine. The chopper may be removed and replaced if necessary to sharpen the same. A particularly useful point due to the special construction of this invention, is that it may be placed beneath the tractor. This permits the applicant to sell a machine as described herein to the owner of any kind of tractor. It may be attached to practically any tractor. The construction herein set forth is believed to be of the most effective and simple character.

Having described the invention, I claim:

In a field pick up and hay chopper adapted to be carried below a tractor, in combination, a power take off arranged to be connected with and to receive power from said tractor, a main shaft driven by said power take off, a blower provided with an upstanding discharge pipe, said blower having driving devices and pulley and belt connections arranged to be driven by said main shaft to operate the said blower, a hay chopper arranged next to the blower and opening into the blower, a chopper shaft, said chopper shaft and main shaft having pulley and belt devices whereby the said chopper shaft is driven, an upper compression roll constructed with a plurality of longitudinally extending channel irons as described, a lower compression roll, a compression roll shaft, said upper and lower compression rolls being constructed and arranged to direct hay into the said chopper, a feeder roll having retractile pins constructed to engage the hay and move same to said compression rolls, a feeder roll shaft, gearing whereby the feeder roll shaft is revolved by said compression roll shaft, rotary pick up devices, a conveyor arranged to receive hay from said pick up devices and move the hay to said feeder roll, pulley and belt connections with said feeder roll shaft constructed to operate said pick up and conveyor, and a frame constructed to support said blower, chopper, compression rolls, pick up devices and conveyor in position.

ARDEN J. McCORMACK.

REFERENCES CITED

The following references are of record in the file of this patent:

UNITED STATES PATENTS

| Number | Name | Date |
| --- | --- | --- |
| 1,204,579 | McCulloch | Nov. 14, 1916 |
| 1,273,975 | Woolworth | July 30, 1918 |
| 1,316,081 | Charles | Sept. 16, 1919 |
| 2,328,278 | Innes | Aug. 31, 1943 |
| 2,345,715 | Reed | Apr. 4, 1944 |
| 2,347,907 | Hill | May 2, 1944 |